United States Patent
Franzen et al.

(10) Patent No.: US 11,537,391 B2
(45) Date of Patent: Dec. 27, 2022

(54) SOFTWARE CHANGE ANALYSIS AND AUTOMATED REMEDIATION

(71) Applicant: Capital One Services, LLC, McLean, VA (US)

(72) Inventors: Krystan R. Franzen, Mechanicsville, VA (US); Mohamed Seck, Aubrey, TX (US)

(73) Assignee: Capital One Services, LLC, McLean, VA (US)

( * ) Notice: Subject to any disclaimer, the term of this patent is extended or adjusted under 35 U.S.C. 154(b) by 57 days.

(21) Appl. No.: 17/149,530

(22) Filed: Jan. 14, 2021

(65) Prior Publication Data

US 2022/0222066 A1    Jul. 14, 2022

(51) Int. Cl.
*G06F 8/70* (2018.01)
*G06F 9/54* (2006.01)
(Continued)

(52) U.S. Cl.
CPC ............ *G06F 8/70* (2013.01); *G06F 3/04847* (2013.01); *G06F 8/65* (2013.01); *G06F 9/541* (2013.01);
(Continued)

(58) Field of Classification Search
CPC .......... G06F 8/60; G06F 8/65–66; G06F 8/70; G06F 11/0793; G06F 9/54; G06F 9/541;
(Continued)

(56) References Cited

U.S. PATENT DOCUMENTS

| 2003/0135840 A1* | 7/2003 | Szabo | G06F 9/541 |
| | | | 717/102 |
| 2014/0130032 A1* | 5/2014 | Lipinski | G06F 8/65 |
| | | | 717/171 |

(Continued)

OTHER PUBLICATIONS

Musco, Vincenzo., et al., A learning algorithm for change impact prediction, 5th International Workshop on Realizing Artificial Intelligence Synergies in Software Engineering, May 2016, pp. 8-14, [retrieved on Aug. 26, 2022], Retrieved from the Internet: <URL: http://dl.acm.org/>.*

(Continued)

*Primary Examiner* — Geoffrey R St Leger
(74) *Attorney, Agent, or Firm* — Harrity & Harrity, LLP

(57) ABSTRACT

In some implementations, a system may receive dependency indicators associated with a plurality of cloud-based applications and receive change indicators associated with changes to one or more first applications of the plurality of cloud-based applications. The system may receive an indicator associated with an incident ticket based on a problem with a second application of the plurality of cloud-based applications. The device may determine at least one of the change indicators associated with the incident ticket based on dependencies between the one or more first applications and the second application and based on a difference between a time associated with the incident ticket and a time associated with the at least one of the change indicators. The system may, based on determining the at least one of the change indicators, transmit a command to rollback at least one of the changes or to rollforward at least one change.

20 Claims, 9 Drawing Sheets

(51) Int. Cl.
*G06N 20/00* (2019.01)
*H04L 67/00* (2022.01)
*H04L 67/10* (2022.01)
*G06F 3/04847* (2022.01)
*G06N 5/04* (2006.01)
*H04L 67/51* (2022.01)
*G06F 11/07* (2006.01)
*G06F 8/65* (2018.01)

(52) U.S. Cl.
CPC .......... *G06F 11/0793* (2013.01); *G06N 5/04* (2013.01); *G06N 20/00* (2019.01); *H04L 67/10* (2013.01); *H04L 67/34* (2013.01); *H04L 67/51* (2022.05)

(58) Field of Classification Search
CPC ...... G06F 3/04847; G06N 20/00; G06N 5/04; H04L 67/10; H04L 67/16; H04L 67/34
USPC .......................................... 717/120, 168–173
See application file for complete search history.

(56) References Cited

U.S. PATENT DOCUMENTS

| | | | |
|---|---|---|---|
| 2015/0095322 A1* | 4/2015 | Procopio | G06F 21/6218 707/723 |
| 2015/0169386 A1* | 6/2015 | Gopal | G06F 9/541 719/328 |
| 2019/0213044 A1* | 7/2019 | Cui | G06F 9/5072 |
| 2019/0327154 A1* | 10/2019 | Sahoo | H04L 43/045 |
| 2020/0034135 A1* | 1/2020 | Shi | G06N 20/00 |

OTHER PUBLICATIONS

Steffen Lehnert, "A review of software change impact analysis," Technische Universität Ilmenau (2011).

\* cited by examiner

US 11,537,391 B2

SOFTWARE CHANGE ANALYSIS AND AUTOMATED REMEDIATION

BACKGROUND

In some cloud environments (such as Amazon® Web Services (AWS®), Microsoft® Azure®, or Snowflake®'s Cloud Data Platform), cloud-based applications may depend on each other. For example, a function in a first application may use, as input, output from a function in a second application. In another example, a function in a first application may call a function in a second application during execution of that first function.

SUMMARY

In some implementations, a system for automated application remediation based on change tickets includes one or more memories and one or more processors, communicatively coupled to the one or more memories, configured to receive, from at least one application programming interface (API), one or more dependency indicators associated with a plurality of cloud-based applications; generate a graphical user interface (GUI) for display, wherein the GUI provides a visualization of the plurality of cloud-based applications based on the one or more dependency indicators; receive a plurality of change indicators associated with changes to one or more first applications of the plurality of cloud-based applications; receive an indicator associated with an incident ticket based on a problem with a second application of the plurality of cloud-based applications; determine, based on the one or more dependency indicators, at least one of the change indicators associated with the incident ticket, wherein the determination is based on dependencies between the one or more first applications and the second application and based on a difference between a time associated with the incident ticket and a time associated with the at least one of the change indicators; and transmit a command to rollback at least one of the changes associated with the at least one of the change indicators or to rollforward at least one change related to the one or more first applications or the second application, based on determining the at least one of the change indicators associated with the incident ticket.

In some implementations, a method of generating a dashboard display of application dependencies and automated remediation of incident tickets includes receiving, by a device and from at least one API, one or more dependency indicators associated with a plurality of cloud-based applications; receiving, by the device, a plurality of change indicators associated with changes to one or more first applications of the plurality of cloud-based applications; generating, by the device, a GUI for display, wherein the GUI provides a visualization of the plurality of cloud-based applications based on the one or more dependency indicators and a table with the plurality of change indicators for display; receiving, by the device, an indicator associated with an incident ticket based on a problem with a second application of the plurality of cloud-based applications; determining, by the device and based on the one or more dependency indicators, at least one of the change indicators associated with the incident ticket, wherein the at least one of the change indicators is associated with at least one of the dependency indicators between the one or more first applications and the second application; and transmitting, by the device, a command to rollback at least one of the changes associated with the at least one of the change indicators or to rollforward at least one change related to the one or more first applications or the second application.

In some implementations, a non-transitory computer-readable medium storing a set of instructions for generating GUIs about and transmitting automated communications for change tickets includes one or more instructions that, when executed by one or more processors of a device, cause the device to receive, from at least one API, one or more dependency indicators associated with a plurality of cloud-based applications; receive one or more change indicators associated with one or more changes to one or more first applications of the plurality of cloud-based applications; generate a GUI for display, wherein the GUI provides a visualization of the plurality of cloud-based applications based on the one or more dependency indicators and a table with the one or more change indicators for display; determine, based on the one or more dependency indicators, at least one second application, of the plurality of cloud-based applications, that will be impacted by the one or more changes to the one or more first applications; and transmit, based on a user setting and via one or more communication interfaces, a corresponding message indicating the one or more changes, to the one or more first applications, to one or more user accounts associated with the at least one second application.

DETAILED DESCRIPTION

Figure 1A:
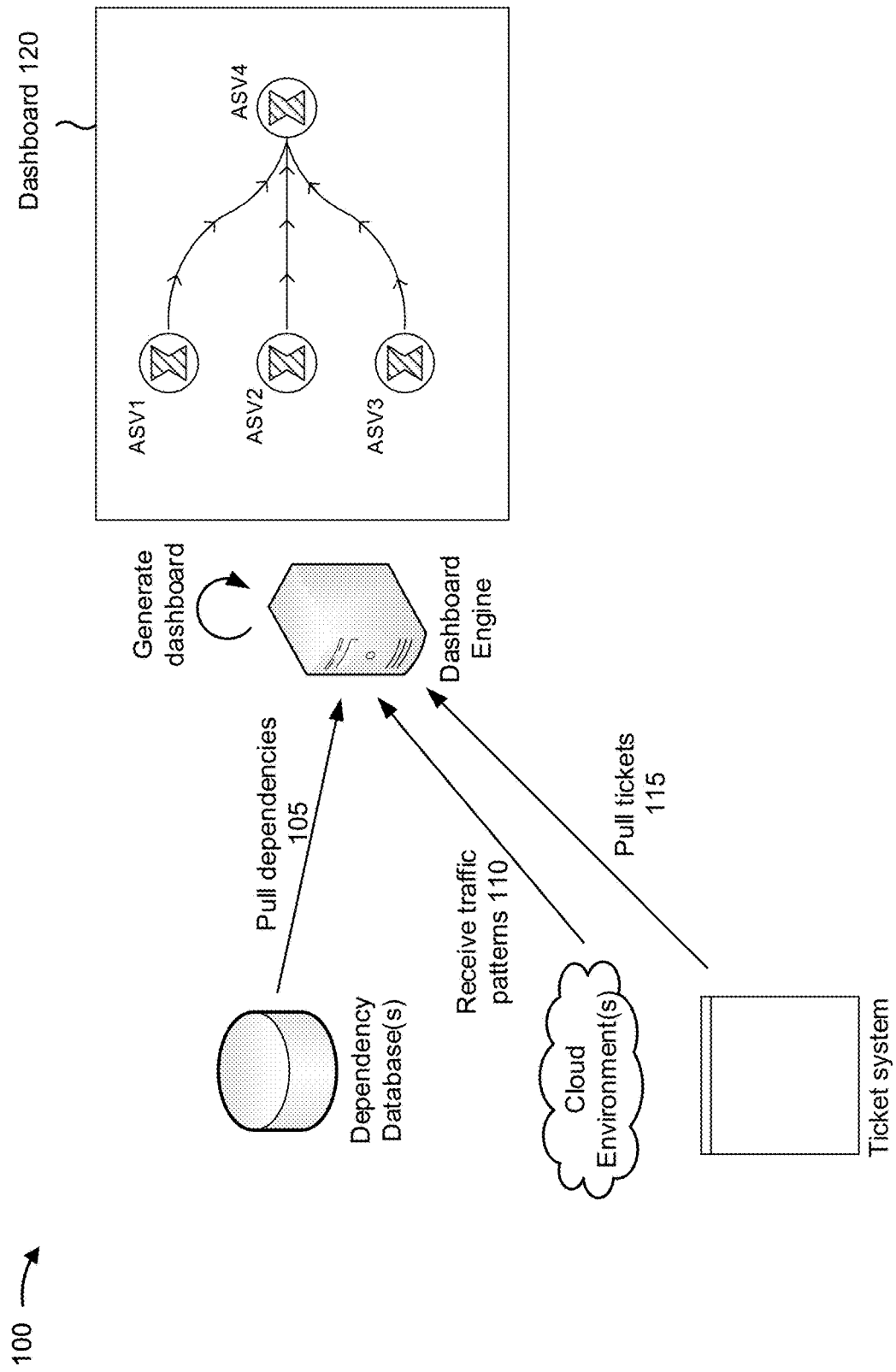
FIGS. 1A-1B are diagrams of an example implementation relating to software change analysis and automated remediation.

The following detailed description of example implementations refers to the accompanying drawings. The same reference numbers in different drawings may identify the same or similar elements.

In some cloud environments, application services (ASVs) or other cloud-based applications may depend on each other. For example, a function in a first application may use, as input, output from a function in a second application. In another example, a function in a first application may call a function in a second application during execution of that first function.

Technical administrators or other users may schedule changes to these ASVs or other cloud-based applications. Such changes may include, for example, security patches, version upgrades, or other software updates or changes. Sometimes, a change may result in a bug or other problem with an application. In such cases, the problem may be resolved by a rollback of the change.

However, in some situations, a change to one cloud-based application may result in a bug or other problem with a different application. For example, due to dependencies between the applications, another application that relies on output from, or calls a function included in, the changed application may no longer function. In this case, the problem is time-consuming and difficult to diagnose and resolve because a change to a different application must be identified and rolled back.

Providing a dashboard that uses a visualization of cloud-based application dependencies and a table with change indicators to quickly and visually inform users improves user experience, and the users are more likely to diagnose and resolve issues faster. Some implementations described herein enable generation of a dashboard that may include such a visualization and table. The users may assess application dependence by selecting a change indicator from the table to generate a corresponding visualization. As a result, the dashboard increases the efficiency of remediation procedures undertaken by the users. This, in turn, conserves computing and networking resources that would otherwise have been wasted in losing productivity during a problem caused by a software change, diagnosing issues caused by the software change, attempting to rollback the software change, training analysts to prevent future problems, and so on.

Additionally, some implementations described herein enable communications about a change to a first application to be sent to administrators or other users that manage other cloud-based applications that depend on that first application. Accordingly, users are proactively alerted of impending changes that could cause technical problems and are likely to diagnose and resolve issues faster. This, in turn, conserves computing and networking resources that would otherwise have been wasted in losing productivity during a problem caused by a software change, diagnosing issues caused by the software change, attempting to rollback the software change, training analysts to prevent future problems, and so on.

Furthermore, some implementations described herein can automatically diagnose when a software change to one application cause issues with another application and perform automated remediation. Performing these remediations automatically reduces delays between detection of the issues and corresponding remediation procedures, thereby improving functionality within a corresponding cloud environment. Some implementations described herein enable automated remediation of vulnerable cloud-based applications and stale cloud-based images. Moreover, automated remediation conserves computing and networking resources that would have been wasted in diagnosing issues caused by the software change, attempting to rollback the software change, training analysts to prevent future problems, and so on. Some implementations may further decide (e.g., using machine learning) to apply a rollforward of a different change rather than a rollback to resolve issues caused by a software change. For example, computing resources are conserved by applying a new software change that fixes issues caused by a previous software change rather than rolling back the previous software change to fix the issues and then having to expend further computing resources re-applying that previous change concurrently with the new software change.

Figure 1B:
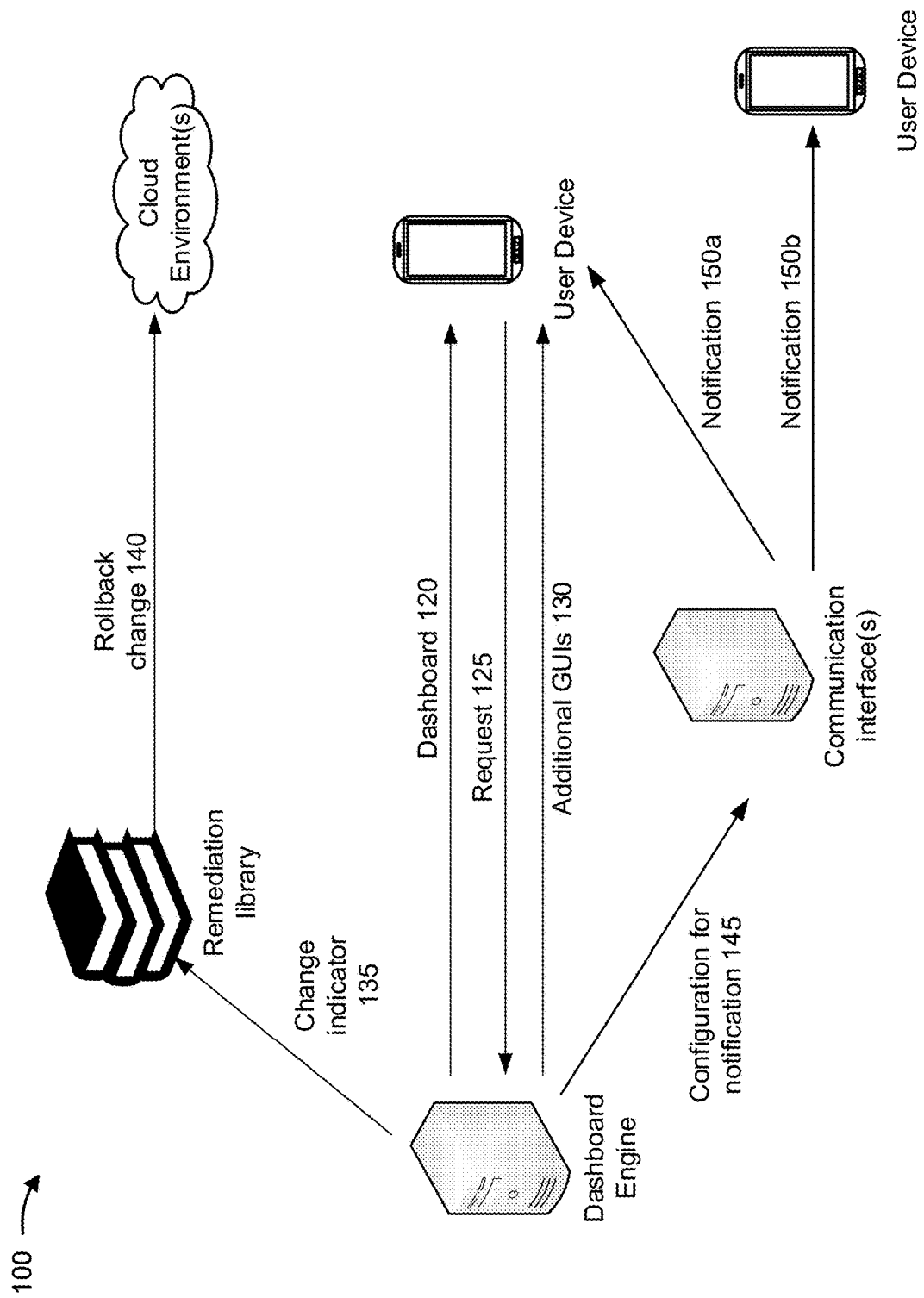

FIGS. 1A-1B are diagrams of an example 100 associated with software change analysis and automated remediation. As shown in FIGS. 1A-1B, example 100 includes one or more vulnerability dependency databases, one or more cloud environments, a ticket system, a dashboard engine, a user device, and one or more communication interfaces. These devices are described in more detail in connection with FIGS. 4 and 5.

As shown by reference number 105, the dashboard engine may receive, from an application programming interface (API) (e.g., at least one API), dependency indicators (e.g., one or more dependency indicators) associated with cloud-based applications (e.g., a plurality of cloud-based applications). For example, the dependency indicators may include references and/or other data structures that indicate associations between the cloud-based applications (which may, in turn, be represented by identifiers, C language structs, object-oriented classes, and/or other data structures). In some implementations, the API may be provided by a dependency database that is associated with one or more cloud-based storages (e.g., one or more Amazon® Machine Images (AMIs), one or more Amazon® Elastic Block Stores (EBSs), and/or one or more other cloud-based storages) used by the cloud-based applications. For example, the dependency database may include an on-site database and/or a remote database storing the information. In some implementations, the database may be relational, such that the dependency indicators are stored in association (e.g., via rows and/or columns) with identifiers of the cloud-based applications. As another example, the database may be graphical, such that nodes representing the cloud-based applications are connected (e.g., via edges) such that the connections represent the dependencies.

Additionally, or alternatively, and as shown by reference number 110, the dashboard engine may determine the dependency indicators using traffic information from an API (e.g., at least one API). For example, the traffic information may indicate data flowing from one Internet protocol (IP) address to another IP address, from one cloud-based image to another cloud-based image, and/or from one server of the cloud-based environment(s) to another server of the cloud-based environment(s), such that the dashboard engine may determine, based on the traffic information, that data flows from one cloud-based application to another cloud-based application. Accordingly, the dashboard engine may determine that there is a dependency between those cloud-based applications. In some implementations, the API may be provided by a network traffic monitor that is associated with one or more cloud-based images that support instances of the cloud-based applications. For example, the network traffic monitor may include a middleman device (e.g., between servers of the cloud-based environment(s) and/or a software application and/or hardware device at least partially integrated (e.g., physically, virtually and/or logically) with the servers.

The dashboard engine may further receive change indicators (e.g., a plurality of change indicators) associated with changes to one or more first applications of the cloud-based applications. For example, the dependency indicators may include references and/or other data structures that indicate associations between the cloud-based applications (which may, in turn, be represented by identifiers, C language structs, object-oriented classes, and/or other data structures). In some implementations, the dashboard engine may receive the change indicators from the cloud-based environment(s) (e.g., using an API). Additionally, or alternatively, the dashboard engine may receive the change indicators from one or more servers that propagate the changes to the first application(s) by transmitting commands to the cloud-based environment(s).

As shown by reference number 115, the dashboard engine may further receive an indicator associated with an incident ticket based on a problem with a second application of the cloud-based applications. For example, the indicator may include a C language struct, an object-oriented class, and/or another data structure that indicates or includes information about the problem (e.g., a string including a description of the problem and/or an identifier associated with the problem) associated with an identifier of the second application (e.g., a process identifier, a thread identifier, an alphanumeric name of the second application, and/or another identifier). In some implementations, the dashboard engine may receive the indicator from a ticket system. For example, the ticket system may include a server that accepts reports from one or more users of the cloud-based environment(s) regarding problems with the cloud-based applications.

As shown by reference number 120, the dashboard engine may generate a GUI for display. For example, the dashboard engine may generate a GUI including one or more components of FIG. 2A, described below. As shown in FIG. 1A, in some implementations, the GUI may provide a visualization of the cloud-based applications based on the dependency indicators. Example 100 includes a graph with different nodes visually representing the cloud-based applications (e.g., "ASV1," "ASV2," "ASV3," and "ASV4" in example 100) and connections between those nodes visually representing dependencies. In some implementations, the visualization of the cloud-based applications may further indicate a directionality associated with each of the dependency indicators. Example 100 includes arrows on the connections to visually represent the directionalities.

As described below with respect to FIG. 2A, in some implementations, the GUI may further provide a table with the change indicators for display. Additionally, or alternatively, and as described below with respect to FIG. 2A, the GUI may further provide a visualization of API errors associated with the cloud-based applications. For example, the GUI may provide a graph and/or table of 4xx errors output by one or more APIs that are provided by the cloud-based applications.

As shown in FIG. 1B, and as further shown by reference number 120, the dashboard engine may output the GUI for display on a user device. For example, the dashboard engine may output the GUI using a web interface (e.g., by the user device browsing to an intranet or Internet website that the dashboard engine uses to display the GUI). Additionally, or alternatively, the user device may execute a mobile application (or "app") or a desktop application that communicates with the dashboard engine and displays the GUI based on output from the dashboard engine.

As shown by reference number 125, the dashboard engine may receive, based on interaction with the GUI, a request to provide more details about one of the cloud-based applications. For example, the interaction may include a left click, a right click, a double click, a tap on a touchscreen, a double tap, and/or another interaction with a portion of the GUI. Accordingly, a user may click or otherwise interact with a node representing cloud-based application "ASV1" (as shown in FIG. 1A) in order to request more details about dependencies between that cloud-based application and other cloud-based applications. In another example, the interaction may include entering alphanumeric characters into a portion of the GUI. Accordingly, a user may enter a name or other identifier of a cloud-based application in order to request more details about dependencies between that cloud-based application and other cloud-based applications. In yet another example, the interaction may include a mouse hover, a long press on a touchscreen, and/or another interaction with a portion of the GUI. Accordingly, a user may hover or otherwise interact with a node representing cloud-based application "ASV1" (as shown in FIG. 1A) in order to request more details about that cloud-based application.

As shown by reference number 130, the dashboard engine may generate a window, within the GUI, that provides details about the one of the cloud-based applications. The dashboard engine may generate the window in response to the interaction. For example, the dashboard engine may generate a window including one or more components of FIG. 2B, described below.

In some implementations, the dashboard engine may additionally or alternatively generate another GUI that provides a table with the indicator, associated with the incident ticket, for display. The dashboard engine may generate the additional GUI in response to a request from the user device (e.g., an interaction with a button or other component that causes the dashboard engine to generate the additional GUI). For example, the dashboard engine may generate an additional GUI including one or more components of FIG. 2C, described below.

As shown by reference number 135, the dashboard engine may determine, based on the dependency indicators, a change indicator (e.g., at least one change indicator) associated with the incident ticket. Accordingly, the dashboard engine may diagnose one or more changes to the first application(s) that are likely to have caused the problem with the second application. Thus, the change indicator may be associated with one of the dependency indicators between the first application(s) and the second application.

In some implementations, the dashboard engine may determine the change indicator associated with the incident ticket based on dependencies between the first application(s) and the second application. For example, the dashboard engine may select the change indicator associated with the incident ticket from a set of change indicators associated only with first application(s) that are connected to the second application via the dependency indicators. Additionally, in some implementations, the dashboard engine may further limit the set of change indicators to those associated with first application(s) upon which the second application depends for input. Accordingly, the dashboard engine may determine the change indicator associated with the incident ticket based on directionalities associated with the dependencies between the first application(s) and the second application. Additionally, or alternatively, the dashboard engine may determine the change indicator associated with the incident ticket based on layers of dependency between the first application(s) and the second application. For example, the dashboard engine may determine that one change indicator, associated with a first application that is two layers removed from the second application (e.g., because a different first application, upon which the second application depends, depends on that first application), is less likely be associated with the incident ticket than another change indicator that is associated with a first application upon which the second application directly depends.

Additionally, or alternatively, the dashboard engine may determine the change indicator associated with the incident ticket based on a difference between a time associated with the incident ticket and a time associated with the change indicator. The time associated with the change indicator may include a time when the change associated with that indicator was deployed. The time associated with the incident ticket may include a time when the incident ticket was submitted and/or a time indicated by a user that submitted the incident ticket. In some implementations, the dashboard engine may select the change indicator associated with the incident ticket from a set of change indicators associated with times that are within a threshold of the time associated with the incident ticket. Additionally, or alternatively, the dashboard engine may determine that one change indicator, associated with a time that is within a first difference of the time associated with the incident ticket, is less likely be associated with the incident ticket than another change indicator that is associated with a time that is within a closer, second difference of the time associated with the incident ticket.

In some implementations, the dashboard engine may use both differences between the time associated with the incident ticket and times associated with the change indicators and dependencies between the first application(s) and the second application. For example, the dashboard engine may combine factors sequentially, such as by assessing differences between the time associated with the incident ticket and times associated with a set of change indicators, where the set of change indicators is limited to change indicators associated with first application(s) upon which the second application depends (e.g., within a threshold number of layers). Accordingly, the dashboard engine may determine the change indicator associated with the incident ticket based on which change indicator, of the set of change indicators, has a closest associated time to the time associated with the incident ticket. As an alternative, the dashboard engine may combine factors sequentially by assessing layers of dependency for first application(s) associated with a set of change indicators, where the set of change indicators is limited to change indicators associated with times that are within a threshold of the time associated with the incident ticket. Accordingly, the dashboard engine may determine the change indicator associated with the incident ticket based on which change indicator, of the set of change indicators, is associated with a first application that has a closest dependency to the second application.

In another example, the dashboard engine may combine factors holistically, such as by scoring change indicators (e.g., indicating a degree of likeliness to have caused the problem with the second application) based on differences between the time associated with the incident ticket and times associated with the change indicators and dependencies between the first application(s) and the second application. Accordingly, the dashboard engine may determine the change indicator associated with the incident ticket based on which change indicator has a highest score.

In some implementations, the dashboard engine may apply a trained machine learning model (e.g., as described below with respect to FIG. 3) to determine the change indicator associated with the incident ticket. For example, the trained machine learning model may output an identifier of the change indicator associated with the incident ticket. As an alternative, the trained machine learning model may output scores such that the dashboard engine may determine the change indicator associated with the incident ticket based on which change indicator has a highest score. In some implementations, as described below with respect to FIG. 3, the dashboard engine may apply the trained machine learning model to differences between the time associated with the incident ticket and times associated with the change indicators, dependencies between the first application(s) and the second application, and/or differences between times associated with the change indicators and a time associated with input to the second application from the first application(s).

As shown by reference number 140, the dashboard engine may transmit a command to rollback a change (e.g., at least one change) associated with change indicator that is associated with the incident ticket. For example, the dashboard engine may transmit the command to the cloud environment(s). Accordingly, the dashboard engine may reverse the change and thus restore a corresponding cloud-based application to a previous version. As an alternative, the dashboard engine may transmit a command to rollforward a change (e.g., at least one change) related to the first application(s) or the second application.

The dashboard engine may transmit the command based on determining the change indicator associated with the incident ticket. For example, the dashboard engine may transmit a command to rollback a change associated with that change indicator after determining the change indicator associated with the incident ticket. In another example, the dashboard engine may determine that a change, associated with change indicator that is associated with the incident ticket, is linked to another upcoming change to the first application(s) or the second application. Accordingly, the dashboard engine may transmit a command to rollforward that linked change rather than rollback.

In some implementations, the dashboard engine may apply a trained machine learning model (e.g., as described below with respect to FIG. 3) to determine whether to rollback or to rollforward. In some implementations, as described below with respect to FIG. 3, the dashboard engine may apply the trained machine learning model based on historical incident tickets and resolution information. For example, the trained machine learning model may identify one or more features of historical incident tickets that are associated with a resolution that included a rollback and one or more features of other historical incident tickets that are associated with a resolution that included a rollforward. Accordingly, the trained machine learning model may assess one or more features of the incident ticket to predict whether the dashboard engine should initiate a rollback or a rollforward.

As shown by reference number 145, the dashboard engine may transmit, based on a user setting and via one or more communication interfaces, a corresponding message, indicating the rollback or rollforward, to one or more user devices (or user accounts) associated with the one or more first applications or the second application. Although the description below is described using different user devices, the description similarly applies to different user accounts even if multiple user accounts share one user device and/or a user account is associated with multiple user devices. The corresponding message may include an identifier of a cloud-based application associated with the rollback or rollforward, a time and/or date when the rollback or rollforward was propagated, an identifier of a change indicator associated with the rollback or rollforward, and/or additional information associated with the rollback or rollforward.

Additionally, or alternatively, the dashboard engine may determine, based on the dependency indicators, a different change (e.g., at least one other change) scheduled for a future time. For example, the different change may be associated with the second application that is experiencing a problem according to the incident ticket. In another example, the different change may be associated with a cloud-based application that depends on the second application. In some implementations, the dashboard engine may determine the different change based on dependencies between a cloud-based application (e.g., one or more applications) associated with the different change and the second application. For example, the dashboard engine may determine the different change by determining that the different change is associated with an application that is within a threshold quantity of dependency layers of the second application. Additionally, or alternatively, the dashboard engine may determine the different change based on a difference between a time associated with the different change and a time associated with the incident ticket. For example, the dashboard engine may determine the different change by determining that a scheduled time associated with the different change is within a threshold of the time associated with the incident ticket.

In some implementations, the dashboard engine may use both differences between the time associated with the incident ticket and times associated with upcoming changes and dependencies between other cloud-based applications and the second application. For example, the dashboard engine may combine factors such that the different change is selected both because the different change is associated with an application that is within a threshold quantity of dependency layers of the second application and because a scheduled time associated with the different change is within a threshold of the time associated with the incident ticket. As an alternative, the dashboard engine may combine factors holistically, such as by scoring changes (e.g., indicating a likelihood of exacerbating the problem with the second application) based on differences between the scheduled times associated with the changes and the time associated with the incident ticket and based on dependencies between the other cloud-based applications and the second application. Accordingly, the dashboard engine may select one or more of those changes based on which changes are associated with scores that satisfy a threshold.

Accordingly, the dashboard engine may transmit, based on a user setting and via one or more communication interfaces, a corresponding message to one or more user devices (or users) associated with the different change. The corresponding message may indicate that the different change is likely to exacerbate an ongoing problem with the second application.

Accordingly, in some implementations, the corresponding message may ask the user(s) to halt propagation of that different change. As an alternative, the dashboard engine may transmit a command to halt implementation of the different change. For example, the dashboard engine may transmit the command to the cloud environment(s). Accordingly, the dashboard engine may pause propagation of the different change, at least until the problem with the second application is resolved. In such implementations, the corresponding message may indicate the command to halt implementation.

In some implementations, the dashboard engine may receive an indication (e.g., from the ticket system) that the problem with the second application is resolved. Accordingly, the dashboard engine may transmit a command to resume implementation of the different change. For example, the dashboard engine may transmit the command to the cloud environment(s). In such implementations, the dashboard engine may transmit, based on a user setting and via one or more communication interfaces, a corresponding message that indicates the command to resume implementation.

Additionally, or alternatively, the dashboard engine may determine, based on the dependency indicators, that the second application may be impacted by an upcoming change (e.g., one or more upcoming changes) to the first application(s). In some implementations, the dashboard engine may determine the upcoming change based on dependencies between the first application(s) and the second application. For example, the dashboard engine may determine the upcoming change by determining that the upcoming change is associated with a first application that is within a threshold quantity of dependency layers of the second application. Additionally, or alternatively, the dashboard engine may determine the upcoming change based on a time associated with the upcoming change. For example, the dashboard engine may determine the upcoming change by determining that a scheduled time associated with the upcoming change is within a threshold of a current system time.

In some implementations, the dashboard engine may use both times associated with upcoming changes and dependencies between the first application(s) and the second application. For example, the dashboard engine may combine factors such that the upcoming change is selected both because the upcoming change is associated with a first application that is within a threshold quantity of dependency layers of the second application and because a scheduled time associated with the upcoming change is within a threshold of the current system time. As an alternative, the dashboard engine may combine factors holistically, such as by scoring changes (e.g., indicating a likelihood of affecting the second application) based on differences between the scheduled times associated with the changes and the current system time and based on dependencies between the first application(s) and the second application. Accordingly, the dashboard engine may select one or more of those changes based on which changes are associated with scores that satisfy a threshold.

Accordingly, in some implementations, the dashboard engine may transmit, based on a user setting and via one or more communication interfaces, a corresponding message indicating the upcoming change, to the first application(s), to one or more user devices (or user accounts) associated with the second application. The corresponding message may indicate that the upcoming change is likely to affect the second application.

As shown by reference number 150*a*, the system may use a communication interface to transmit the corresponding message to the user device. In example 100, the user device may be the same user device that accessed the dashboard. The corresponding message may include an email, a text message, a chat message, and/or another message. The user device may access the corresponding message using credentials (e.g., a username and password, a key associated with a single sign-on (SSO) session).

Additionally, or alternatively, and as shown by reference number 150*b*, the system may use a communication interface to transmit the corresponding message to a different user device than the user device that accessed the dashboard. This user device may access the corresponding message using credentials (e.g., a username and password, a key associated with an SSO session).

In some implementations, the system may determine which users will receive the corresponding message based on one or more settings. For example, the system may send the notification to a user device associated with a first user based on one stored setting that indicates the system should send the notification to that user, but may refrain from sending the notification to a user device associated with a second user based on a different stored setting that indicates the system should not send the notification to that user.

Additionally, or alternatively, the system may determine which type of notification to send based on one or more settings. For example, the system may send an email to a user device associated with a first user based on one stored setting that indicates the system should send emails to that user, but may send a chat message to a user device associated with a second user based on a different stored setting that indicates the system should send chat messages to that user.

By using the techniques described above, the dashboard engine can provide an improved interface to visualize application dependencies. As a result, the user experience is improved with more efficient and accurate GUIs than provided by existing techniques. Additionally, in some implementations and as described above, the dashboard engine may provide automated remediation. Accordingly, the dashboard engine may increase speed and efficiency of remediation procedures, which conserves computing and networking resources that would have been wasted in diagnosing issues caused by the software change, attempting to rollback the software change, training analysts to prevent future problems, and so on. In some implementations, and as described above, the dashboard engine may decide to apply a rollforward rather than a rollback, which further conserves computing resources as compared with rolling back a previous software change to fix one or more software issues and then having to expend further computing resources re-applying that previous change concurrently with a new software change.

As indicated above, FIGS. 1A-1B are provided as an example. Other examples may differ from what is described with regard to FIGS. 1A-1B.

Figure 2A:
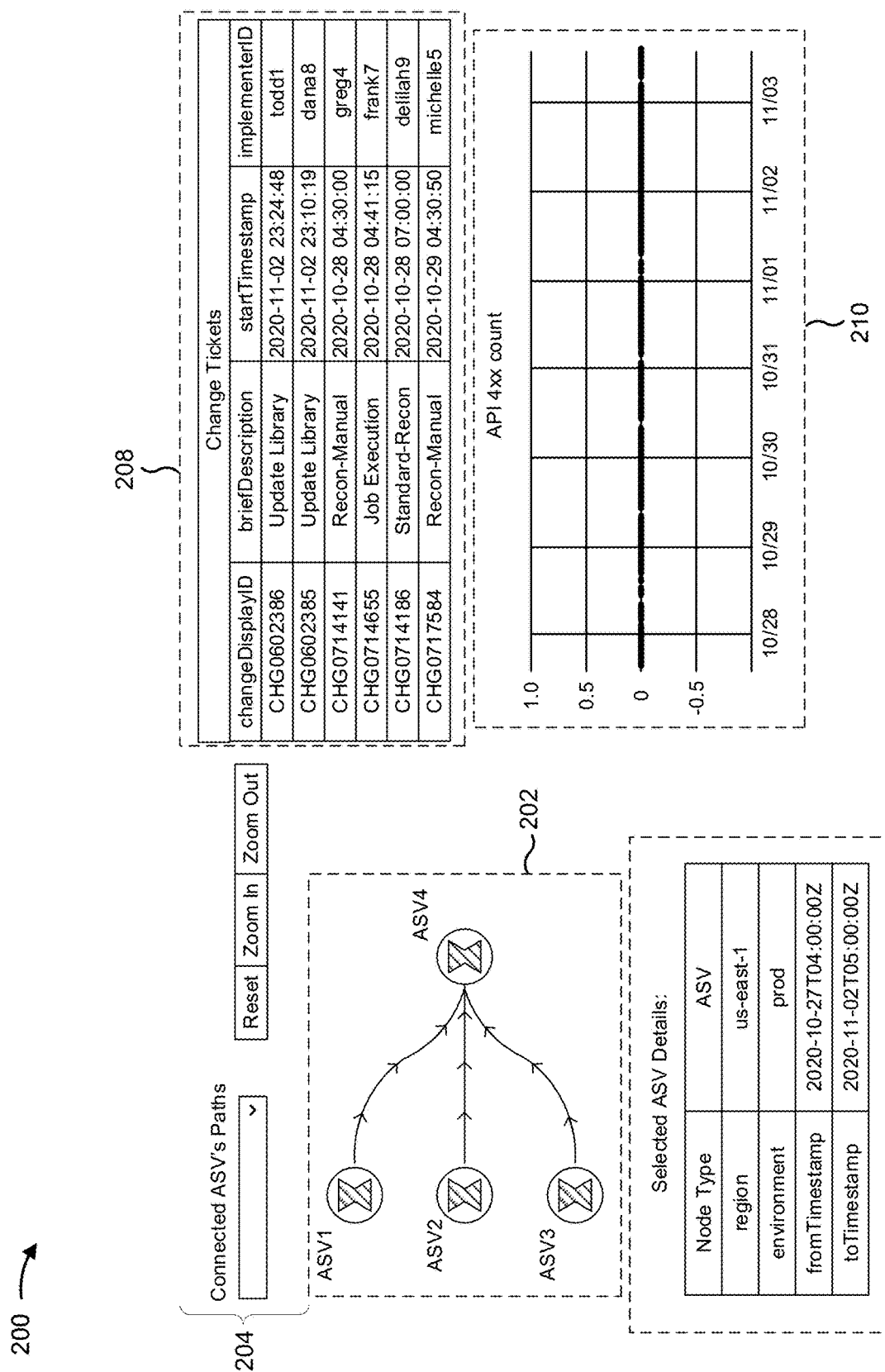
FIGS. 2A, 2B, and 2C are diagrams of example graphical user interfaces (GUIs) generated by systems and/or methods described herein.
Figure 2B:
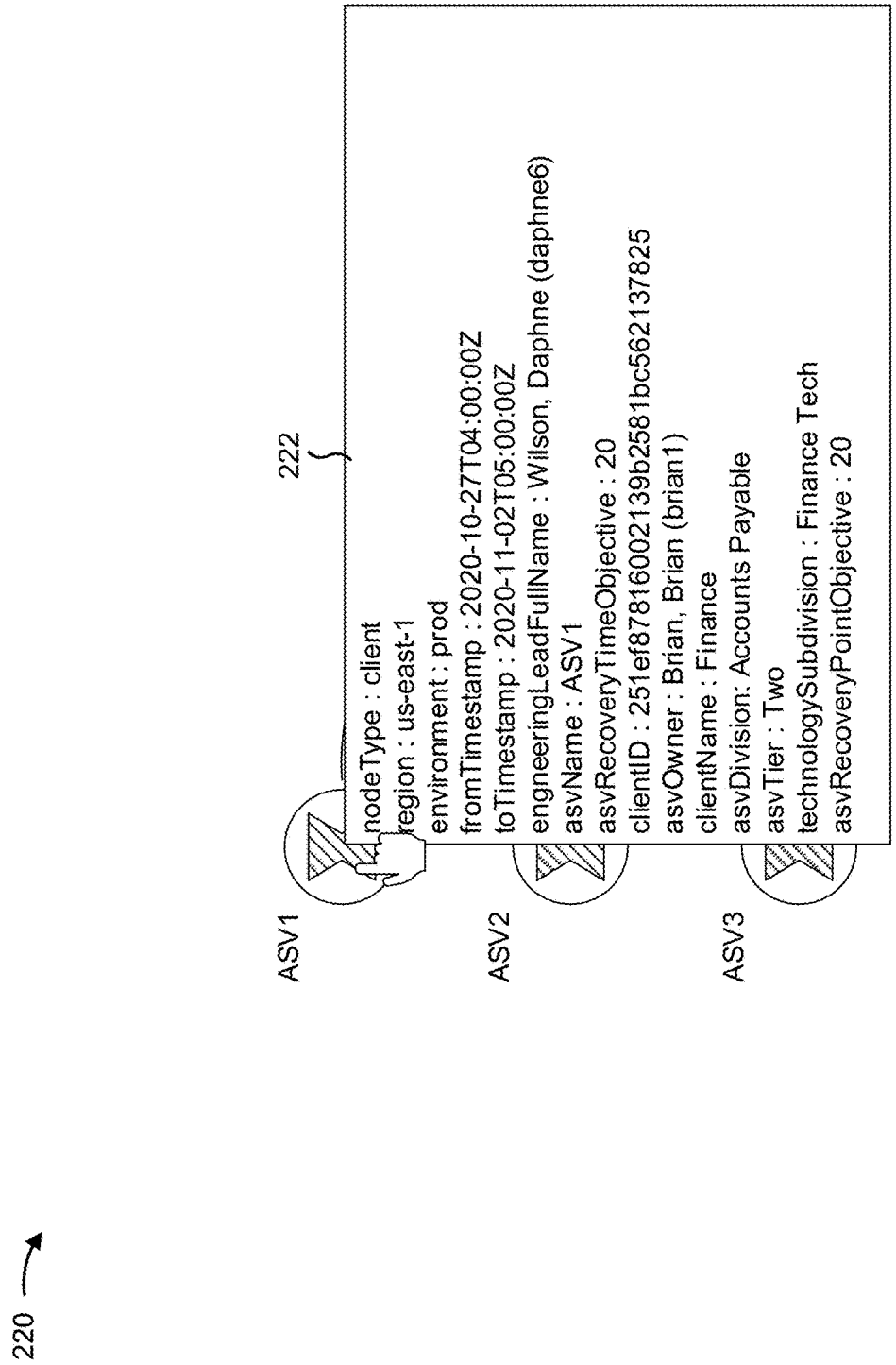
Figure 2C:
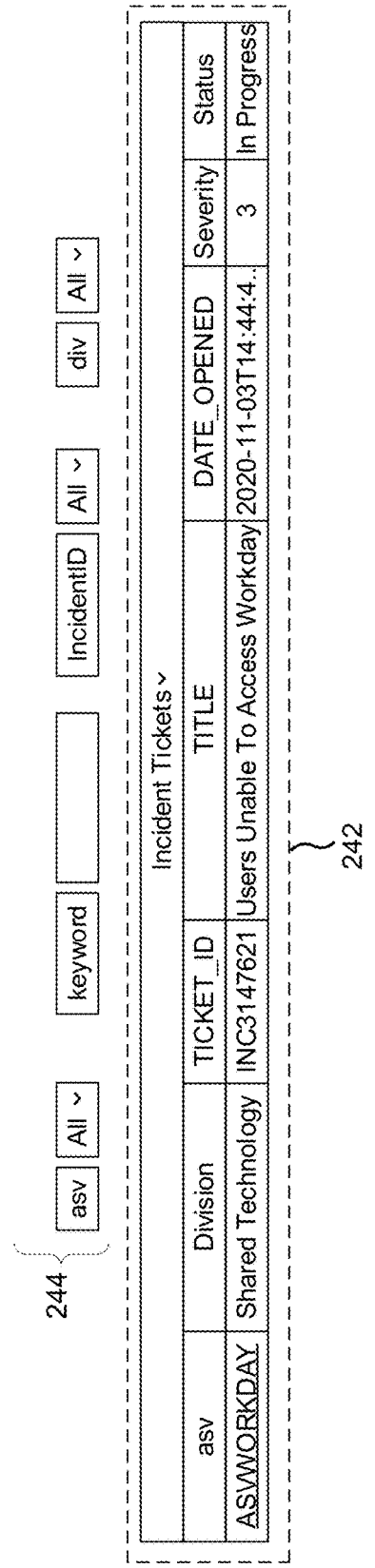

FIGS. 2A-2C are diagrams of example GUIs generated by systems and/or methods described herein. For example, one or more components of the GUIs depicted in FIGS. 2A-2C may be provided in the GUI described above in connection with FIGS. 1A-1B. Accordingly, example 200 may be generated to display a visualization of cloud-based applications based on dependency indicators (e.g., as described above in connection with FIG. 1A). Similarly, example 220 may be a window generated in response to a request to provide more details about a cloud-based application (e.g., as described above in connection with FIG. 1B). Additionally, example 240 may be an additional GUI generated to provide a table with an indicator associated with an incident ticket for display (e.g., as described above in connection with FIG. 1B).

As shown in FIG. 2A, example 200 includes a visualization 202 of cloud-based applications (shown as nodes labeled "ASV1," "ASV2," "ASV3," and "ASV4" in example 200) with corresponding connectors (e.g., based on dependency indicators). In some implementations, the visualization may further show directionalities (shown as the arrows on the connectors in example 200). Example 200 further includes one or more filters 204 for visualizing a particular cloud-based application. A user may enter a name or other identifier of the cloud-based application (e.g., in a text box as shown in example 200) or may revert to a previous cloud-based application (e.g., using a "Reset" button as shown in example 200). Additionally, example 200 may include a table 206 providing details regarding one of the cloud-based applications. In some implementations, table 206 may show a region associated with that cloud-based application (shown as the "region" row in example 200), a cloud environment associated with that cloud-based application (shown as the "environment" row in example 200), a starting timestamp associated with a last initialization of that cloud-based application (shown as the "fromTimestamp" row in example 200), and/or an ending timestamp associated with the last initialization of that cloud-based application (shown as the "toTimestamp" row in example 200). Additionally, or alternatively, example 200 may include a table 208 with change indicators for display. For example, the change indicators may be associated with one or more of the cloud-based applications included in the visualization 202. In some implementations, table 208 may show identifiers associated with the change indicators (shown as the "changeDisplayID" column in example 200), descriptions associated with the change indicators (shown as the "briefDescription" column in example 200), timestamps associated with propagation of changes associated with the change indicators (shown as the "startTimestamp" column in example 200), and/or users associated with the change indicators (shown as the "implementerID" column in example 200). Additionally, or alternatively, example 200 may include a graph 210 with API errors associated with the cloud-based applications. For example, graph 210 may show 4xx errors output by one or more APIs that are provided by the cloud-based applications. Graph 210 in example 200 includes a line graph that shows the API errors over time but may additionally or alternatively include a pie chart, a bar graph, and/or another graph. The GUI described above in connection with FIG. 1A may include one or more components of example 200. For example, the GUI may include one or more of visualization 202, table 206, table 208, and/or graph 210. In some implementations, the GUI may provide filters 204 to select a cloud-based application used to populate visualization 202, table 206, table 208, and/or graph 210.

As shown in FIG. 2B, example 220 includes a window 222 with details of a cloud-based application for display. In some implementations, window 222 may indicate a type associated with the cloud-based application (e.g., shown as "nodeType" in example 220), a region associated with the cloud-based application (e.g., shown as "region" in example 220), a starting timestamp associated with a last initialization of that cloud-based application (e.g., shown as "fromTimestamp" in example 220), an ending timestamp associated with the last initialization of that cloud-based application (e.g., shown as "toTimestamp" in example 220), one or more users associated with the cloud-based application (e.g., shown as "engineeringLeadFullName" and "asvOwner" in example 220), a name of the cloud-based application (e.g., shown as "asvName" in example 220), a recovery time objective associated with the cloud-based application (e.g., shown as "asvRecoveryTimeObjective" in example 220), one or more divisions (e.g., of a company) associated with the cloud-based application (e.g., shown as "clientName," "asvDivision," and "technologySubdivision" in example 220), a tier associated with the cloud-based application (e.g., shown as "asvTier" in example 220), and/or a recovery point objective associated with the cloud-based application (e.g., shown as "asvRecoveryPointObjective" in example 220). The window described above in connection with FIG. 1B may include one or more components of example 220. For example, the window may include window 222 of FIG. 2B.

As shown in FIG. 2C, example 240 includes a table 242 with indicators of incident tickets for display. In some implementations, table 242 may indicate cloud-based applications associated with the incident tickets (shown as the "asv" column in example 240), divisions (e.g., of a company) associated with the incident tickets (shown as the "Division" column in example 240), identifiers associated with the incident tickets (shown as the "TICKET_ID" column in example 240), descriptions associated with the incident tickets (shown as the "TITLE" column in example 240), timestamps associated with the incident tickets (shown as the "DATE_OPENED" column in example 240), severity levels associated with the incident tickets (shown as the "Severity" column in example 240), and/or statuses associated with the incident tickets (shown as the "Status" column in example 240). Example 240 further includes one or more filters 244 for selecting incident tickets. Filters 244 may determine the incident tickets based on ASVs (e.g., selecting one or more cloud-based applications for which open incident tickets will be retrieved), keywords (e.g., selecting incident tickets that include the keyword in names and/or descriptions), incident identifiers (IDs) (e.g., selecting an incident ticket with a particular incident ID), division (e.g., selecting incident tickets that are associated with that division of a company), and/or other similar filters. The additional GUI described above in connection with FIG. 1B may include one or more components of example 240. For example, the additional GUI may include table 242. In some implementations, the additional GUI may provide filters 244 to select one or more incident tickets used to populate table 242.

As indicated above, FIGS. 2A-2C are provided as examples. Other examples may differ from what is described with regard to FIGS. 2A-2C.

Figure 3:
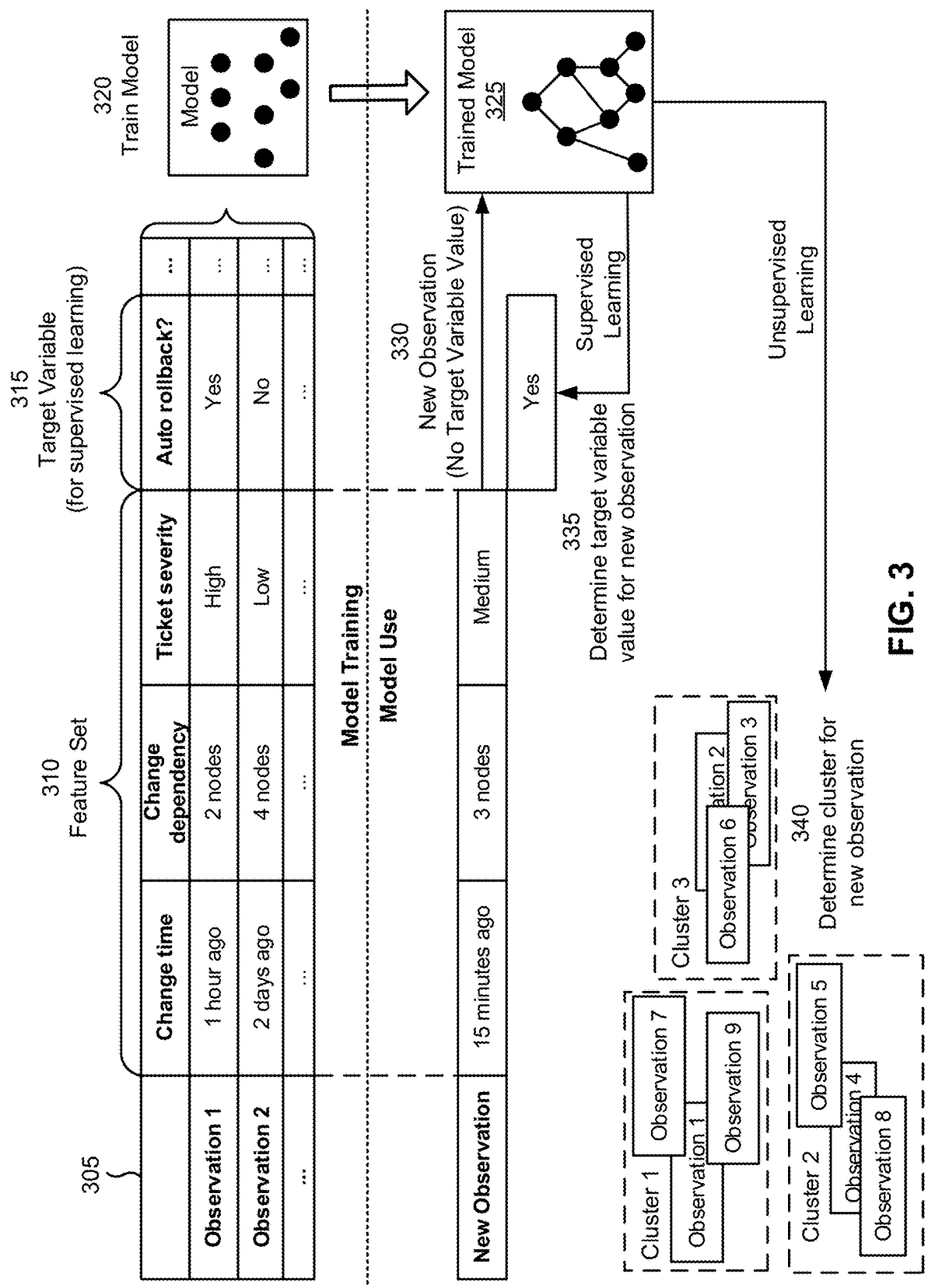
FIG. 3 is a diagram of an example of training and using a machine learning model in connection with systems and/or methods described herein.

FIG. 3 is a diagram illustrating an example 300 of training and using a machine learning model in connection with systems and/or methods described herein. The machine learning model training and usage described herein may be performed using a machine learning system. The machine learning system may include or may be included in a computing device, a server, a cloud computing environment, or the like, such as the dashboard engine described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from one or more dependency databases, one or more cloud environments, and/or a ticket system, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the dependency database(s), cloud environment(s), and/or ticket system. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of a time associated with a change indicator, a second feature of a dependency between one application associated with the change indicator and another application associated with an incident ticket, a third feature of a severity level associated with the incident ticket, and so on. As shown, for a first observation, the first feature may have a value of 1 hour ago (e.g., relative to a time associated with the incident ticket), the second feature may have a value of 2 nodes, the third feature may have a value of "High" severity, and so on. These features and feature values are provided as examples, and may differ in other examples. For example, the feature set may include one or more of the following features: an association between the change indicator and a different upcoming change and/or a directionality associated with the dependency.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, or labels) and/or may represent a variable having a Boolean value. A target variable may be associated with a target variable value, and a target variable value may be specific to an observation. In example 300, the target variable is a Boolean, which has a value of "Yes" (or 1 or TRUE) for the first observation. Accordingly, the target variable may indicate that the model recommends that a change associated with the change indicator be rolled back.

The feature set and target variable described above are provided as examples, and other examples may differ from what is described above. For example, for a target variable of "No" (or 0 or FALSE), the feature set may include a first feature of 2 days ago, a second feature of 4 nodes, and a third feature of "Low" severity. In another example, the target variable may additionally or alternatively be an indicator of whether the model recommends a rollback of a change associated with the change indicator or a rollforward of an upcoming change. In such an example, for a target variable indicating rollback, the feature set may include a feature that indicates no association between the change associated with the change indicator and an upcoming change and/or a feature that indicates a directionality towards the cloud-based application associated with the incident ticket from the cloud-based application associated with the change indicator. Alternatively, for a target variable indicating rollforward, the feature set may include a feature that indicates an association between the change associated with the change indicator and an upcoming change and/or a feature that indicates a directionality towards the cloud-based application associated with the incident ticket from a cloud-based application associated with the upcoming change.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like.

After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of 15 minutes ago, a second feature of 3 nodes, a third feature of "Medium" severity, and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of "Yes" (or 1 or TRUE) for the target variable for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, recommending a rollback of the change associated with the change indicator. The first automated action may include, for example, transmitting a command to rollback the change associated with the change indicator.

As another example, if the machine learning system were to predict a value of "No" (or 0 or FALSE) for the target variable, then the machine learning system may provide a second (e.g., different) recommendation (e.g., recommending against a rollback of the change associated with the change indicator) and/or may perform or cause performance of a second (e.g., different) automated action (e.g., refraining from transmitting a command to rollback the change associated with the change indicator).

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., likely to be resolved by rollback), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., unlikely to be resolved by rollback or likely to be resolved by rollforward), then the machine learning system may provide a second (e.g., different) recommendation (e.g., recommending against a rollback of the change associated with the change indicator or recommending a rollforward of an upcoming change, respectively) and/or may perform or cause performance of a second (e.g., different) automated action, such as refraining from transmitting a command to rollback the change associated with the change indicator or transmitting a command to rollforward the upcoming change, respectively.

In some implementations, the recommendation and/or the automated action associated with the new observation may be based on a target variable value having a particular label (e.g., classification or categorization), may be based on whether a target variable value satisfies one or more thresholds (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to determining to perform automated remediation and/or determining whether to rollback or rollforward changes. The machine learning system enables recognition and/or identification of tens, hundreds, thousands, or millions of features and/or feature values for tens, hundreds, thousands, or millions of observations, thereby increasing accuracy and consistency and reducing delay associated with remediating cloud-based applications relative to requiring computing resources to be allocated for tens, hundreds, or thousands of operators to manually remediate problems using the features or feature values.

The machine learning system described above may additionally or alternatively apply a rigorous and automated process to diagnosing problems with cloud-based applications. The machine learning system enables recognition and/or identification of tens, hundreds, thousands, or millions of features and/or feature values for tens, hundreds, thousands, or millions of observations, thereby increasing accuracy and consistency and reducing delay associated with identifying change requests associated with incident time relative to requiring computing resources to be allocated for tens, hundreds, or thousands of operators to manually diagnose problems using the features or feature values.

As indicated above, FIG. 3 is provided as an example. Other examples may differ from what is described in connection with FIG. 3.

Figure 4:
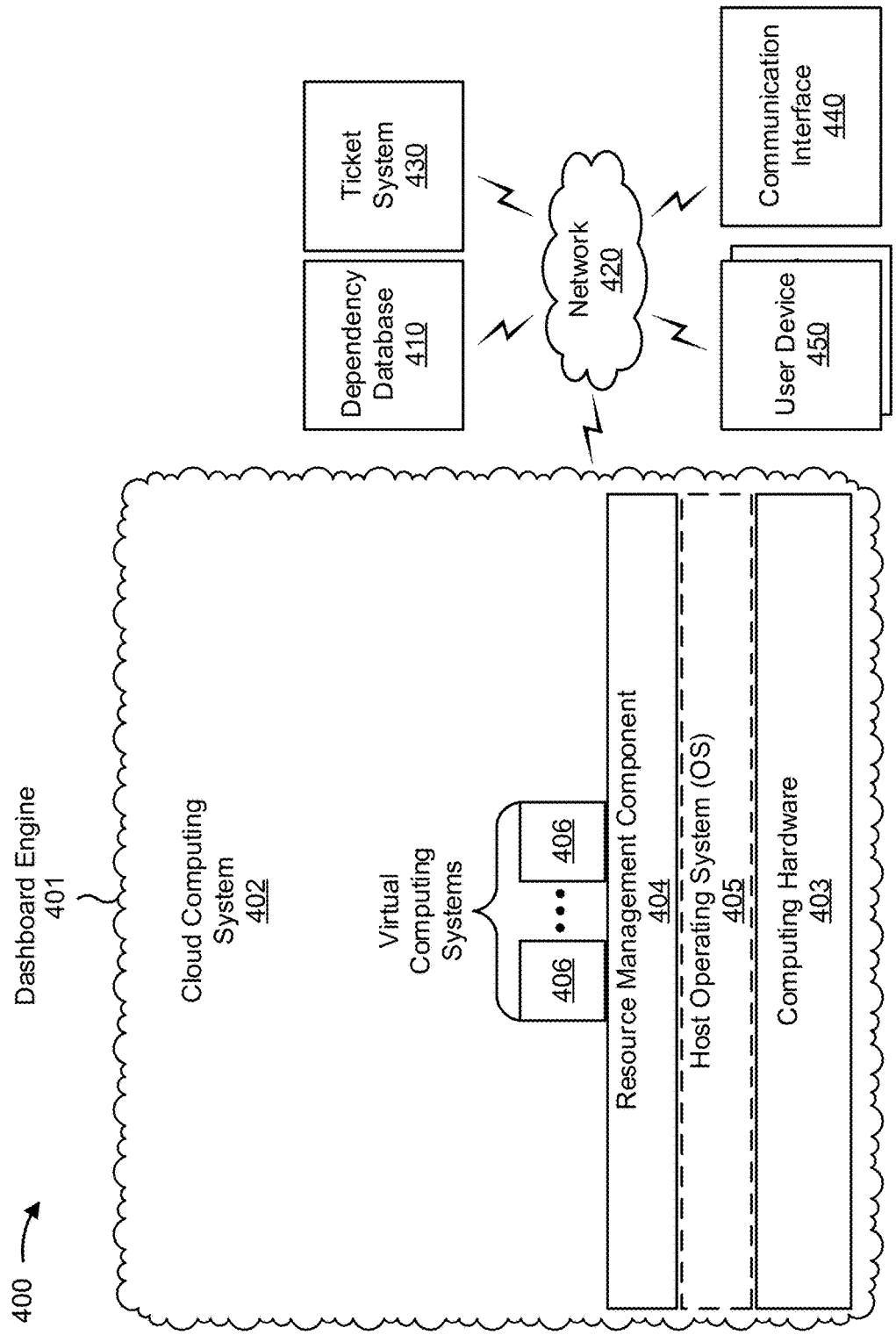
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a dashboard engine 401, which may include one or more elements of and/or may execute within a cloud computing system 402. The cloud computing system 402 may include one or more elements 403-406, as described in more detail below. As further shown in FIG. 4, environment 400 may include a dependency database 410, a network 420, a ticket system 430, a communication interface 440, and/or a user device 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer, a server, and/or the like) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. Computer hardware 403 may include one or more processors, one or more memories, one or more storage components, and/or one or more networking components, examples of which are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, and/or the like) or a virtual machine monitor, such as when the virtual computing systems 406 are virtual machines. Additionally, or alternatively, the resource management component 404 may include a container manager, such as when the virtual computing systems 406 are containers. In some implementations, the resource management component 404 executes within and/or in coordination with a host operating system 405.

A virtual computing system 406 includes a virtual environment that enables cloud-based execution of operations and/or processes described herein using computing hardware 403. A virtual computing system 406 may execute one or more applications using a file system that includes binary files, software libraries, and/or other resources required to execute applications on a guest operating system (e.g., within the virtual computing system 406) or the host operating system 405.

Although the dashboard engine 401 may include one or more elements 403-406 of the cloud computing system 402, may execute within the cloud computing system 402, and/or may be hosted within the cloud computing system 402, in some implementations, the dashboard engine 401 may not be cloud-based (e.g., may be implemented outside of a cloud computing system) or may be partially cloud-based. For example, the dashboard engine 401 may include one or more devices that are not part of the cloud computing system 402, such as device 500 of FIG. 5, which may include a standalone server or another type of computing device. The dashboard engine 401 may perform one or more operations and/or processes described in more detail elsewhere herein.

Dependency database 410 may be implemented on a cloud computing system at least partially integrated with cloud computing system 402 (e.g., as computing hardware 403) or distinct from cloud computing system 402 (e.g., as a standalone server). In some implementations, the dependency database 410 may include one or more devices (e.g., one or more servers) that are not part of a cloud computing system, such as device 500 of FIG. 5, which may include a standalone server or another type of computing device. The dependency database 410 may store information regarding dependencies between cloud-based applications, as described elsewhere herein.

Network 420 includes one or more wired and/or wireless networks. For example, network 420 may include a cellular network, a public land mobile network (PLMN), a local area network (LAN), a wide area network (WAN), a private network, the Internet, and/or the like, and/or a combination of these or other types of networks. The network 420 enables communication among the devices of environment 400.

Ticket system 430 may be implemented on a cloud computing system at least partially integrated with cloud computing system 402 (e.g., as computing hardware 403) or distinct from cloud computing system 402 (e.g., as a standalone server). In some implementations, the ticket system 430 may include one or more devices (e.g., one or more servers) that are not part of a cloud computing system, such as device 500 of FIG. 5, which may include a standalone server or another type of computing device. The ticket system 430 may store information regarding incident tickets, as described elsewhere herein.

Communication interface 440 may be implemented on a cloud computing system at least partially integrated with cloud computing system 402 (e.g., as computing hardware 403) or distinct from cloud computing system 402 (e.g., as a standalone server). In some implementations, the communication interface 440 may include one or more devices (e.g., one or more servers) that are not part of a cloud computing system, such as device 500 of FIG. 5, which may include a standalone server or another type of computing device. The communication interface 440 may deliver, to user devices, messages regarding cloud-based application dependencies, rollback or rollforward of changes to cloud-based applications, and/or halted or resumed implementations of upcoming changes to cloud-based applications, based on instructions from the dashboard engine 401, as described elsewhere herein.

User device 450 may include one or more devices capable of receiving GUIs and/or messages regarding cloud-based application dependencies. The user device 450 may include a communication device. For example, the user device 450 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device 450 may communicate with the dashboard engine 401 based on interaction with the GUIs. Additionally, or alternatively, the user device 450 may receive messages from communication interfaces that were configured by the dashboard engine 401, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
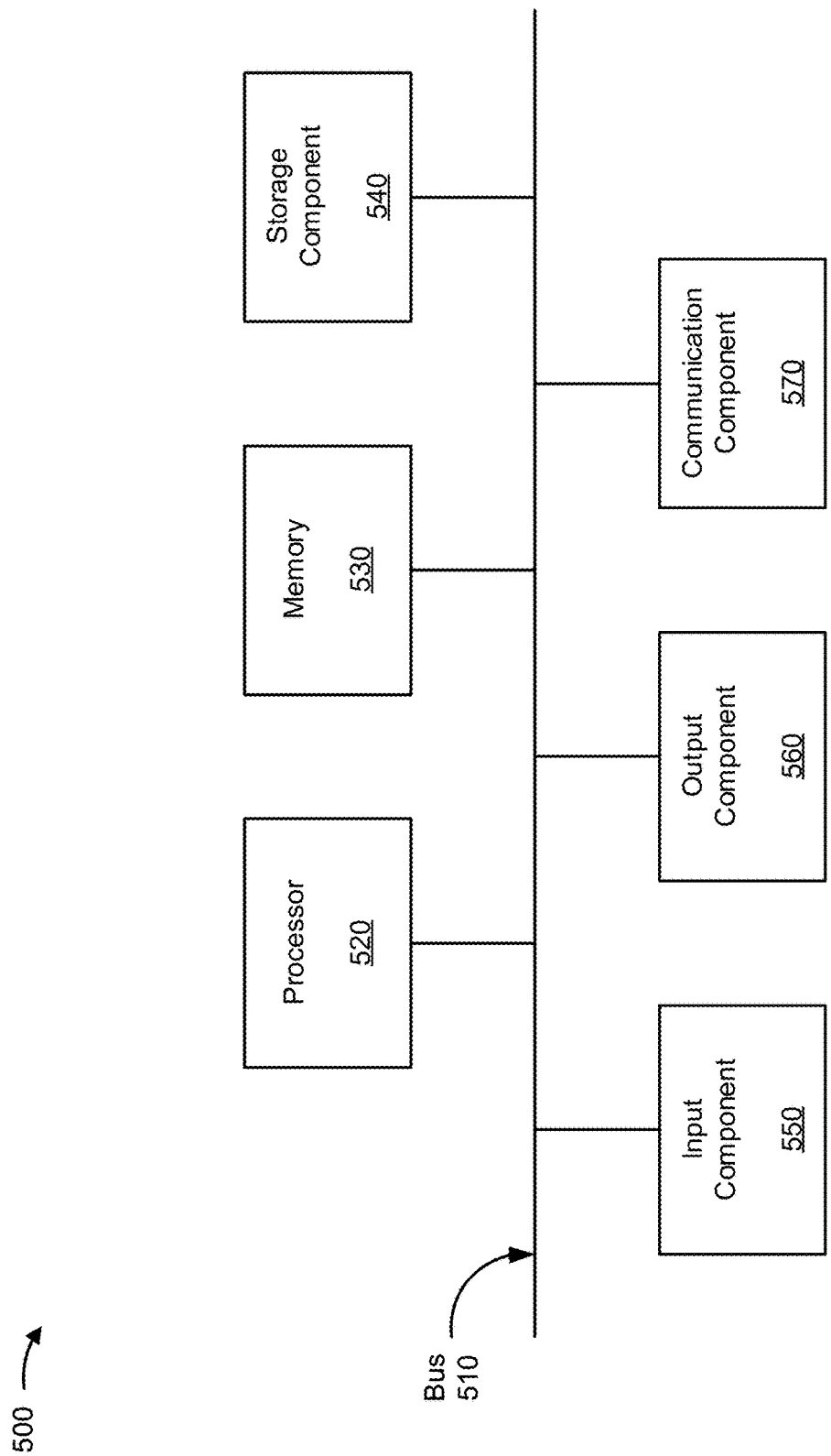
FIG. 5 is a diagram of example components of one or more devices of FIG. 4.

FIG. 5 is a diagram of example components of a device 500, which may correspond to a vulnerability database, a data source, a communication interface, and/or a user device. In some implementations, a dependency database, a ticket system, a communication interface, and/or a user device may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random-access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid-state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
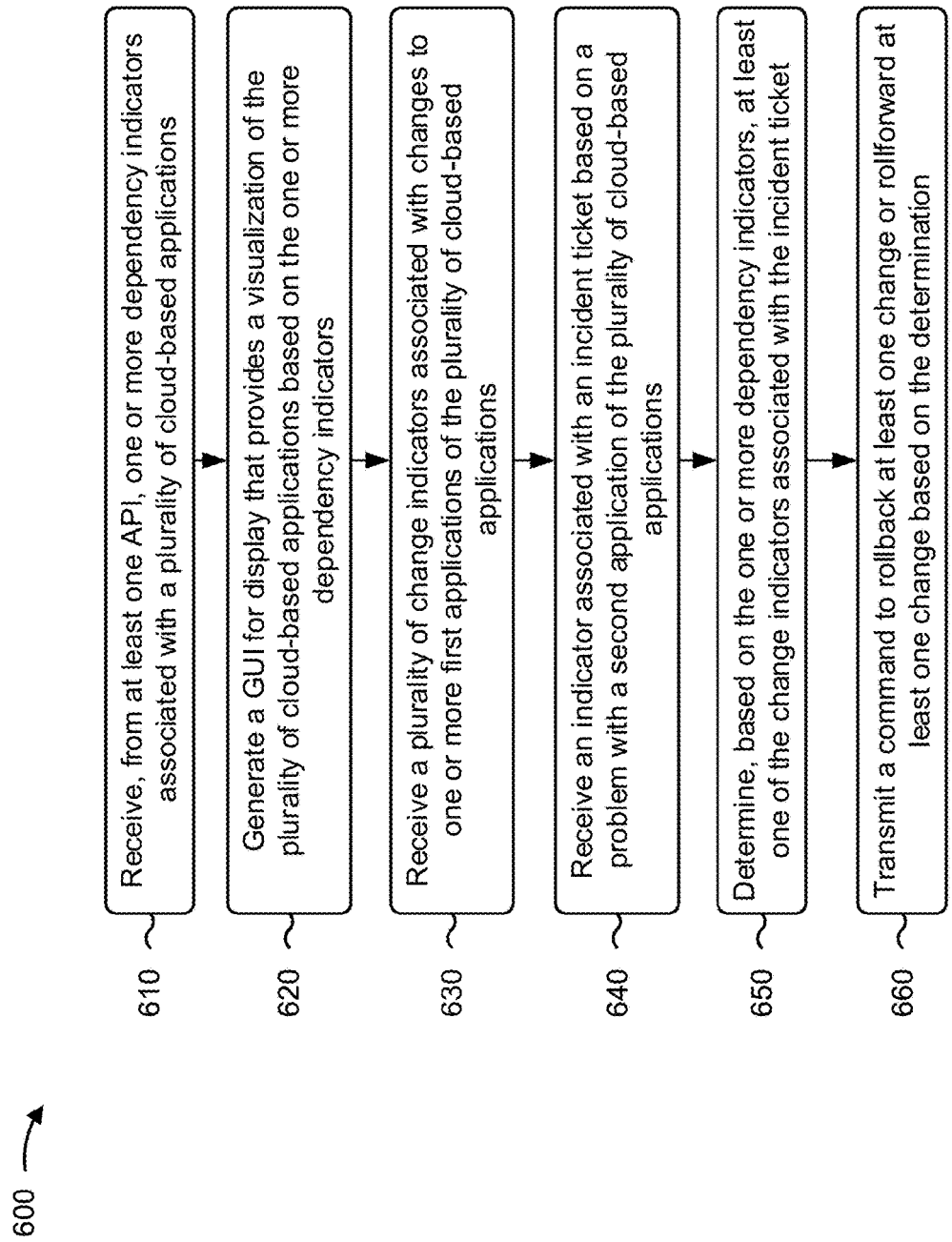
FIG. 6 is a flowchart of an example process relating to software change analysis and automated remediation.

FIG. 6 is a flowchart of an example process 600 associated with software change analysis and automated remediation. In some implementations, one or more process blocks of FIG. 6 may be performed by a system (e.g., dashboard engine 401). In some implementations, one or more process blocks of FIG. 6 may be performed by another device or a group of devices separate from or including the system, such as dependency database 410, ticket system 430, communication interface 440, and/or user device 450. Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving, from at least one API, one or more dependency indicators associated with a plurality of cloud-based applications (block 610). As further shown in FIG. 6, process 600 may include generating a GUI for display that provides a visualization of the plurality of cloud-based applications based on the one or more dependency indicators (block 620). As further shown in FIG. 6, process 600 may include receiving a plurality of change indicators associated with changes to one or more first applications of the plurality of cloud-based applications (block 630). As further shown in FIG. 6, process 600 may include receiving an indicator associated with an incident ticket based on a problem with a second application of the plurality of cloud-based applications (block 640). As further shown in FIG. 6, process 600 may include determining, based on the one or more dependency indicators, at least one of the change indicators associated with the incident ticket (block 650). In some implementations, the determination may be based on dependencies between the one or more first applications and the second application and/or based on a difference between a time associated with the incident ticket and a time associated with the at least one of the change indicators. Additionally, or alternatively, the determination may be based on a trained machine learning model. As further shown in FIG. 6, process 600 may include transmitting a command to rollback at least one of the changes associated with the at least one of the change indicators or to rollforward at least one change related to the one or more first applications or the second application, based on determining the at least one of the change indicators associated with the incident ticket (block 660). In some implementations, a determination whether to rollback or rollforward may be based on historical incident tickets and resolution information. Additionally, or alternatively, the determination may be based on a trained machine learning model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for automated application remediation based on change tickets, the system comprising:
   one or more memories; and
   one or more processors, communicatively coupled to the one or more memories, configured to:
   receive, from at least one application programming interface (API), one or more dependency indicators associated with a plurality of cloud-based applications;
   generate a graphical user interface (GUI) for display, wherein the GUI provides a visualization of the plurality of cloud-based applications based on the one or more dependency indicators;
   receive a plurality of change indicators associated with changes to one or more first applications of the plurality of cloud-based applications;
   receive an indicator associated with an incident ticket based on a problem with a second application of the plurality of cloud-based applications;
   determine, based on the one or more dependency indicators, at least one of the plurality of change indicators is associated with the incident ticket, wherein the determination is based on dependencies between the one or more first applications and the second application and based on a difference between a time associated with the incident ticket and a time associated with the at least one of the plurality of change indicators; and
   transmit a command to rollback at least one of the changes associated with the at least one of the plurality of change indicators or to rollforward at least one change related to the one or more first applications or the second application, based on determining the at least one of the plurality of change indicators is associated with the incident ticket.

2. The system of claim 1, wherein the one or more processors are further configured to:
   transmit, based on a user setting and via one or more communication interfaces, a corresponding message, indicating the rollback or rollforward, to one or more user devices or user accounts associated with the one or more first applications or the second application.

3. The system of claim 1, wherein the one or more processors are further configured to:
   determine, based on the one or more dependency indicators, at least one other of the changes scheduled for a future time; and
   transmit, based on a user setting and via one or more communication interfaces, a corresponding message to one or more users associated with the at least one other of the changes.

4. The system of claim 3, wherein the one or more processors, when determining the at least one other of the changes, are configured to:
   determine the at least one other of the changes based on dependencies between one or more applications associated with the at least one other of the changes and the second application and based on a difference between a time associated with the at least one other of the changes and a time associated with the incident ticket.

5. The system of claim 3, wherein the one or more processors are further configured to:
   transmit a command to halt implementation of the at least one other of the changes; and
   wherein the corresponding message indicates the command to halt implementation.

6. The system of claim 1, wherein the one or more processors, when determining the at least one of the change indicators is associated with the incident ticket, are configured to:
   apply a trained machine learning model to determine the at least one of the change indicators is associated with the incident ticket.

7. The system of claim 1, wherein the one or more processors are further configured to:
   apply a trained machine learning model to determine whether to rollback or to rollforward.

8. A method of generating a dashboard display of application dependencies and automated remediation of incident tickets, comprising:
   receiving, by a device and from at least one application programming interface (API), one or more dependency indicators associated with a plurality of cloud-based applications;
   receiving, by the device, a plurality of change indicators associated with changes to one or more first applications of the plurality of cloud-based applications;

generating, by the device, a graphical user interface (GUI) for display, wherein the GUI provides a visualization of the plurality of cloud-based applications based on the one or more dependency indicators and a table with the plurality of change indicators for display;

receiving, by the device, an indicator associated with an incident ticket based on a problem with a second application of the plurality of cloud-based applications;

determining, by the device and based on the one or more dependency indicators, at least one of the change indicators is associated with the incident ticket, wherein the at least one of the change indicators is associated with at least one of the dependency indicators between the one or more first applications and the second application; and transmitting, by the device, a command to rollback at least one of the changes associated with the at least one of the change indicators or to rollforward at least one change related to the one or more first applications or the second application.

9. The method of claim 8, wherein determining the at least one of the change indicators is associated with the incident ticket comprises:

applying a trained machine learning model, to the one or more dependency indicators and to differences between a time associated with the incident ticket and times associated with the plurality of change indicators, to determine the at least one of the change indicators is associated with the incident ticket.

10. The method of claim 8, further comprising:

applying a trained machine learning model, based on historical incident tickets and resolution information, to determine whether to rollback or to rollforward.

11. The method of claim 8, wherein the at least one API includes an API provided by a dependency database that is associated with one or more cloud-based storages used by the cloud-based applications.

12. The method of claim 8, wherein the at least one API includes an API provided by a network traffic monitor that is associated with one or more cloud-based images that support instances of the cloud-based applications.

13. The method of claim 8, further comprising:

determining, based on the one or more dependency indicators, at least one other of the changes scheduled for a future time; and transmitting a command to halt implementation of the at least one other of the changes.

14. The method of claim 8, further comprising:

generating another GUI that provides a table with the indicator, associated with the incident ticket, for display.

15. A non-transitory computer-readable medium storing a set of instructions for generating graphical user interfaces (GUIs) and transmitting automated communications for change tickets, the set of instructions comprising:

one or more instructions that, when executed by one or more processors of a device, cause the device to:

receive, from at least one application programming interface (API), one or more dependency indicators associated with a plurality of cloud-based applications;

receive one or more change indicators associated with one or more changes to one or more first applications of the plurality of cloud-based applications;

generate a GUI for display, wherein the GUI provides a visualization of the plurality of cloud-based applications based on the one or more dependency indicators and a table with the one or more change indicators for display;

determine, based on the one or more dependency indicators, at least one second application, of the plurality of cloud-based applications, that will be impacted by the one or more changes to the one or more first applications;

determine, based on an incident ticket and the one or more dependency indicators, to rollback the one or more changes or to rollforward at least one change related to the one or more first applications or the at least one second application; and transmit, based on a user setting and via one or more communication interfaces, a corresponding message indicating the one or more changes and the rollback or rollforward, to the one or more first applications, or to one or more user accounts associated with the at least one second application.

16. The non-transitory computer-readable medium of claim 15, wherein the visualization of the plurality of cloud-based applications further indicates a directionality associated with each of the one or more dependency indicators.

17. The non-transitory computer-readable medium of claim 15, wherein the GUI further provides a visualization of API errors associated with the plurality of cloud-based applications.

18. The non-transitory computer-readable medium of claim 15, wherein the one or more instructions further cause the device to:

receive, based on interaction with the GUI, a request to provide more details about one of the cloud-based applications; and generate a window, within the GUI, that provides one or more details about the one of the cloud-based applications.

19. The non-transitory computer-readable medium of claim 15, wherein the one or more instructions further cause the device to:

receive an indicator associated with an incident ticket based on a problem with the at least one second application; and wherein the corresponding message is transmitted based on the incident ticket.

20. The non-transitory computer-readable medium of claim 15, wherein the corresponding message includes one or more of:

an identifier of a cloud-based application associated with the rollback or the rollforward, a time associated with the rollback or the rollforward, or an identifier of a change indicator, of the one or more change indicators, associated with the rollback or the rollforward.

* * * * *